(12) United States Patent
Taniguchi

(10) Patent No.: US 9,611,381 B2
(45) Date of Patent: Apr. 4, 2017

(54) METHOD FOR PRODUCING RUBBER COMPOSITION

(71) Applicant: TOYO TIRE & RUBBER CO., LTD., Osaka-shi, Osaka (JP)

(72) Inventor: Sho Taniguchi, Osaka (JP)

(73) Assignee: TOYO TIRE & RUBBER CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 14/877,371

(22) Filed: Oct. 7, 2015

(65) Prior Publication Data

US 2016/0115305 A1    Apr. 28, 2016

(30) Foreign Application Priority Data

Oct. 16, 2014 (JP) ................................ 2014-211930

(51) Int. Cl.
| | |
|---|---|
| C08L 9/00 | (2006.01) |
| C08L 9/06 | (2006.01) |
| C08L 7/00 | (2006.01) |
| B60C 1/00 | (2006.01) |
| C08J 3/20 | (2006.01) |
| C08L 15/00 | (2006.01) |

(52) U.S. Cl.
CPC .... C08L 9/06 (2013.01); B60C 1/00 (2013.01); C08J 3/20 (2013.01); C08L 7/00 (2013.01); C08L 15/00 (2013.01)

(58) Field of Classification Search
CPC .... B60C 1/00; C08J 3/20; C08L 15/00; C08L 9/06; C08L 7/00; C08K 3/36
See application file for complete search history.

(56) References Cited

U.S. PATENT DOCUMENTS

| | | |
|---|---|---|
| 6,184,296 B1 | 2/2001 | Obrecht et al. |
| 2002/0049282 A1 | 4/2002 | Obrecht et al. |
| 2002/0077414 A1 | 6/2002 | Obrecht |
| 2003/0092827 A1 | 5/2003 | Obrecht et al. |
| 2008/0169053 A1* | 7/2008 | Nakamura ............ B60C 1/0016 152/209.5 |
| 2012/0214903 A1 | 8/2012 | Masumoto |

FOREIGN PATENT DOCUMENTS

| | | |
|---|---|---|
| EP | 2 716 700 A1 | 4/2014 |
| JP | 10-204225 A | 8/1998 |
| JP | 2004-504465 A | 2/2004 |
| JP | 2004-506058 A | 2/2004 |
| JP | 2004-530760 A | 10/2004 |
| JP | 2011-046875 A | 3/2011 |

* cited by examiner

*Primary Examiner* — Nathan M Nutter
(74) *Attorney, Agent, or Firm* — Westerman, Hattori, Daniels & Adrian, LLP

(57) ABSTRACT

A method for producing a rubber composition that can improve wet grip performance is provided. The rubber composition includes 100 parts by mass of a rubber component, from 20 to 150 parts by mass of silica, and from 1 to 10 parts by mass of a polymer gel as crosslinked diene polymer particles, wherein from 30 to 90 parts by mass of at least one modified diene rubber selected from the group consisting of a styrene-butadiene rubber, a butadiene rubber and a natural rubber, each having introduced therein a functional group having an interaction with the silica, and from 70 to 10 parts by mass of an unmodified dine rubber are used as 100 parts by mass of the rubber component, and a polymer gel having a functional group which has an interaction with a functional group of the modified diene rubber is used as the polymer gel.

13 Claims, No Drawings

METHOD FOR PRODUCING RUBBER COMPOSITION

CROSS-REFERENCE TO RELATED APPLICATIONS

This application is based upon and claims the benefit of priority from the prior Japanese Patent Application No. 2014-211930, filed on Oct. 16, 2014; the entire contents of which are incorporated herein by reference.

BACKGROUND

1. Technical Field

The present invention relates to a method for producing a rubber composition, and further relates to a rubber composition obtained by the method and a pneumatic tire.

2. Related Art

It is conventionally known in a rubber composition used in a tread rubber of a pneumatic tire to add a polymer gel containing a functional group in order to improve grip performance (wet grip performance) on a wet road surface. For example, JP-A-2011-046875 and EP2716700A1 propose that 10 to 150 parts by mass of silica and 10 to 30 parts by mass of a hydroxyl group-containing diene rubber gel having a glass transition temperature of −40 to −10° C. are added to 100 parts by mass of a rubber component.

On the other hand, in the case of using silica as a filler in a rubber composition for a tread, it is known to use a modified diene rubber having a functional group introduced therein which has an interaction with silica for the purpose of improving rolling resistance performance and wet grip performance by the improvement of dispersibility of silica (for example, see US2012/0214903A1).

Thus, a polymer gel having a functional group is used to improve wet grip performance. However, where the polymer gel is used together with a modified diene rubber that improves dispersibility of silica, it is the actual situation that the effect is not always sufficient and does not reach the level expected in the wet pip performance.

SUMMARY

In view of the above, the present embodiment has an object to provide a method for producing a rubber composition that can improve wet grip performance.

The method for producing a rubber composition according to the present embodiment provides a rubber composition including 100 parts by mass of a rubber component, from 20 to 150 parts by mass of silica, and from 1 to 10 parts by mass of a polymer gel which is crosslinked diene polymer particles, in which from 30 to 90 parts by mass of at least one modified diene rubber selected from the group consisting of a styrene-butadiene rubber, a butadiene rubber, and a natural rubber, each having introduced therein a functional group having an interaction with the silica, and from 70 to 10 parts by mass of an unmodified diene rubber are used as 100 parts by mass of the rubber component, and a polymer gel having a functional group which has an interaction with a functional group of the modified diene rubber is used as the polymer gel. The production method includes a first step of mixing the entire amount of the modified diene rubber with the polymer gel together with the silica to obtain a first mixture, and a second step of mixing the unmodified diene rubber with the first mixture obtained.

A rubber composition according to an embodiment is obtained by the production method. A pneumatic tire according to an embodiment is a pneumatic tire obtained using the rubber composition.

According to the present embodiment, the entire amount of the modified diene rubber is previously mixed with the polymer gel together with the silica. This embodiment can effectively incorporate the polymer gel which has heretofore been dispersed in not only a modified diene rubber but also an unmodified diene rubber into the modified diene rubber. As a result, wet grip performance can be improved while maintaining abrasion resistance and rolling resistance performance.

DETAILED DESCRIPTION

Elements in the embodiment for carrying out the invention are described in detail below.

The rubber composition according to the present embodiment includes 100 parts by mass of a rubber component, from 20 to 150 parts by mass of silica, and from 1 to 10 parts by mass of a polymer gel as crosslinked diene polymer particles.

100 Parts by mass of the rubber component include from 30 to 90 parts by mass of at least one modified diene rubber selected from the group consisting of a styrene-butadiene rubber (SBR), a butadiene rubber (BR) and a natural rubber (NR), each having introduced therein a functional group having an interaction with the silica, and from 70 to 10 parts by mass of an unmodified diene rubber. Thus, when the amount of the modified diene rubber is 30 parts by mass or more, process workability in mixing the rubber composition can be maintained, and the decrease of abrasion resistance can be suppressed. When the amount of the modified diene rubber is 90 parts by mass of less, the decrease of abrasion resistance can be suppressed. The amount of the modified diene rubber in 100 parts by mass of the rubber component is preferably from 40 to 80 parts by mass, and more preferably from 50 to 80 parts by mass. The amount of the unmodified diene rubber in 100 parts by mass of the rubber component is preferably from 60 to 20 parts by mass, and more preferably from 50 to 20 parts by mass. The polymer gel is not included in the rubber component.

Specifically, the modified diene rubber is used in any one kind of modified SBR, modified BR or modified NR, or a combination of two or more kinds thereof, and a rubber as a base component does not have a functional group. Of those, modified SBR and/or modified BR are preferred, and modified SBR is more preferred.

The functional group of the modified dime rubber has an interaction (reactivity or affinity) with a silanol group on the surface of the silica particles, and examples of the functional group include at least one selected from the group consisting of a hydroxyl group, an amino group, a carboxyl group, an alkoxyl group and an epoxy group. The amino group is not only a primary amino group, but may be a secondary or tertiary amino group. Iii the case of the secondary or tertiary amino group, the total carbon atom number of a hydrocarbon group as a substituent is preferably 15 or less. Examples of the alkoxyl group include methoxy group, ethoxy group, propoxy group, butoxy group and the like presented by —OR (wherein R represents, for example, an alkyl group having from 1 to 4 carbon atoms). The alkoxyl group may be contained as an alkoxysilyl group (at least one of three hydrogen atoms of a silyl group is substituted with an alkoxyl group) such as trialkoxysil group, alkyldialkoxysilyl group or dialkylalkoxysilyl group. Examples of the carboxyl group include maleic acid, phthalic acid, acrylic acid and methacrylic acid, and the carboxyl group may be an acid anhydride group including an anhydride of dicarboxylic acid such as maleic acid or phthalic acid. As one embodiment, the functional group of the modified diene rubber may be an amino group and/or an alkoxyl group.

Those functional groups may be introduced in at least one terminal of the diene rubber, or may be introduced in a molecular chain. In other words, the diene rubber may be a terminal-modified diene rubber having the functional group introduced in at least one terminal of the molecular chain of the diene rubber may be a main chain-modified diene rubber having the functional group introduced in the main chain of the diene rubber, and may be a main chain- and terminal-modified diene rubber having the functional group introduced in the main chain and the terminal. The modified diene rubber having the functional group is known, and the production method thereof and the like are not limited. For example, the functional group may be introduced by modifying a diene rubber synthesized by anion polymerization with a modifier. Alternatively, the functional group may be introduced in a polymer chain by copolymerizing a monomer having the functional group together with a monomer constituting a base polymer.

Various diene rubbers that are not modified can be used as the unmodified diene rubber, and examples of the unmodified diene rubber include natural rubber (NR), isoprene rubber (IR), butadiene rubber (BR), styrene-butadiene rubber (SBR), styrene-isoprene rubber, butadiene-isoprene rubber and styrene-butadiene-isoprene rubber. Those rubbers can be used alone or as mixtures of two or more kinds thereof. NR, SBR, BR or a blended rubber of two or more kinds thereof is more preferably used.

The silica is not particularly limited. Wet silica such as wet precipitated silica or wet gelled silica is preferably used. BET specific surface area (measured according to BET method described in HS K6430) of silica is not particularly limited, and may be, for example, from 90 to 250 m$^2$/g, and preferably from 150 to 220 m$^2$/g.

The amount of the silica added is preferably from 20 to 150 parts by mass, more preferably from 30 to 120 parts by mass, and still more preferably from 40 to 100 parts by mass, per 100 parts by mass of the rubber component.

In the rubber composition according to the present embodiment, only silica may be added as a reinforcing filler, but the silica may be used together with carbon black. In this case, the amount of the carbon black added is preferably 100 parts by mass or less, more preferably from 5 to 60 parts by mass, and still more preferably from 10 to 40 parts by mass, per 100 parts by mass of the rubber component. In one embodiment, the reinforcing filler preferably includes silica as a main component. In other words, the amount of the silica added is preferably larger than the amount of the carbon black added, and is more preferably 1.5 times or more (mass ratio) the amount of the carbon black added.

A silane coupling agent such as sulfide silane or mercaptosilane may be added to the rubber composition according to the aspect of the invention. The amount of the silane coupling agent added is not particularly limited, but is preferably from 2 to 20 mass % based on the amount of the silica added (that is, the silane coupling agent is an amount of from 2 to 20 parts by mass per 100 parts by mass of the silica), and more preferably from 5 to 15 mass %.

The polymer gel is a gelled rubber that can be produced by crosslinking a rubber dispersion, and is called a rubber gel. Examples of the rubber dispersion include a rubber latex produced by emulsion polymerization, and a rubber dispersion obtained by emulsifying a rubber obtained by solution polymerization in water. Examples of the crosslinking agent include organic peroxide, an organic azo compound and a sulfur type crosslinking agent. The crosslinking of the diene polymer particles can be conducted by copolymerization with a polyfunctional compound having crosslinking action during emulsion polymerization. Specifically the methods disclosed in JP-A-10-204225 (U.S. Pat. No. 6,184,296B1), JP-T-2004-504465 (US2002/0077414A1) (the term "JP-T" as used herein means a published Japanese translation of a PCT patent application), JP-T-2004-506058 (US2002/0049282A1), JP-T-2004-530760 (US2003/0092827A1) and the like can be used.

Examples of the diene polymer constituting the polymer gel include natural rubber, isoprene rubber, styrene-butadiene rubber, butadiene rubber, styrene-isoprene rubber, butadiene-isoprene rubber and styrene-isoprene-butadiene copolymer rubber. Those may be used alone or as mixtures of two or more kinds thereof. The polymer gel including butadiene rubber or styrene-butadiene rubber as a main component is preferably used.

The glass transition temperature (Tg) of the polymer gel is not particularly limited, but is preferably from −90 to 0° C. and more preferably from −40 to −10° C. The glass transition temperature is a value measured using a differential scanning calorimeter (DSC) according to JIS K7121 (temperature rising rate: 20° C./min).

The average particle diameter of the polymer gel is not particularly limited. For example, DVN value ($d_{50}$) by DIN 53 206 may be from 5 to 2,000 nm, preferably from 10 to 500 nm, and more preferably from 20 to 200 nm.

The polymer gel used in the present embodiment has a functional group having a interaction (reactivity or affinity) with the functional group of the modified diene rubber Examples of the functional group of the polymer gel include at least one selected from the group consisting of a hydroxyl group, an amino group, a carboxyl group, an alkoxyl group and an epoxy group. The amino group is not only a primary amino group, but may be a secondary or tertiary amino group. In the case of the secondary or tertiary amino group, the total carbon atom number of a hydrocarbon group as a substituent is preferably 15 or less. Examples of the alkoxyl group include methoxy group, ethoxy group, propoxy group and butoxy group that are presented by —OR (wherein R represents, for example, an alkyl group having from 1 to 4 carbon atoms). The alkoxyl group may be contained as an alkoxysilyl group such as trialkoxysilyl group, alkyldialkoxysilyl group or dialkylalkoxysilyl group. Examples of the carboxyl group include maleic acid, phthalic acid, acrylic acid and methacrylic acid, and the carboxyl group may be an acid anhydride group including an anhydride of dicarboxylic acid such as maleic acid or phthalic acid. Of those, a hydroxyl group is preferably used as the functional group of the polymer gel.

The polymer gel having the functional group may be synthesized using a monomer having the functional group introduced therein at the time of polymerization of the diene polymer, and the terminal-modified polymer having the functional group introduced in an active terminal after polymerization can be used as the polymer gel having the functional group. Furthermore, the functional group may be introduced in a polymer terminal by using a compound generating the functional group as an initiator at the time of polymerization. The functional group can also be incorporated in the particle surface by reacting a compound having the functional group with C=C double bond on the particle surface after diene polymer particles are produced by the crosslinking.

The amount of the polymer gel added is preferably from 1 to 10 parts by mass per 100 parts by mass of the rubber component. When the amount is 1 part by mass or more, the improvement effect of wet grip performance can be enhanced. When the amount is 10 parts by mass or less, the decrease of abrasion resistance can be suppressed. The amount of the polymer gel added is preferably from 3 to 10 parts by mass per 100 parts by mass of the rubber component.

The rubber composition according to the present embodiment contain various additives generally used in a rubber composition, such as a process oil, zinc flower, stearic acid, an age resister, a wax, a resin, a vulcanizing agent and a vulcanization accelerator, in addition to the above each component. Examples of the vulcanizing agent include sulfur components such as powdered sulfur, precipitated sulfur, colloidal sulfur, insoluble sulfur and highly dispersive sulfur. Although not particularly limited, the amount of the vulcanizing agent added is preferably from 0.1 to 10 parts by mass, and more preferably from 0.5 to 5 parts by mass, per 100 parts by mass of the rubber component.

The method for producing a rubber composition according to the present embodiment includes a first step of mixing the entire amount of the modified diene rubber with the polymer gel together with the silica to obtain a first mixture, and a second step of mixing the unmodified diene rubber with the first mixture obtained.

Thus, wet grip performance can be improved while maintaining abrasion resistance and rolling resistance performance, by preparing a masterbatch by previously mixing the polymer gel with the modified diene rubber. In detail, where the polymer gel is mixed at once with the modified diene rubber and the unmodified diene rubber, the polymer gel disperses in not only the modified diene rubber, but also the unmodified diene rubber. In this case, the polymer gel is hard to uniformly disperse in the unmodified diene rubber, and the improvement effect of wet grip performance cannot be sufficiently exerted. On the other hand, when the polymer gel is previously mixed with the modified diene rubber, the polymer gel can be efficiently incorporated in the modified diene rubber, and dispersibility of the polymer gel is excellent in the modified diene rubber by an interaction between functional groups. As a result, the improvement effect of wet grip performance can be enhanced.

The mixing of the rubber composition can be conducted using a mixing machine generally used, such as Banbury mixer, a kneader or rolls.

In the present embodiment, the first mixture is obtained by feeding the entire amount of the modified diene rubber in a mixing machine and mixing the modified diene rubber with the silica and the polymer gel in the first step. In such a case, it is preferred that the entire amount of the polymer gel is fed in the first step. In other words, it is preferred to mix the entire amount of the polymer gel with the modified diene rubber and the silica in the first step. This can enhance the effect of incorporating the polymer gel into the modified diene rubber.

It is preferred that the entire amount of the silica is fed in the first step. In other words, it is preferred to mix the entire amount of the silica with the modified diene rubber and the polymer gel in the first step. This can incorporate the silica into the modified diene rubber and disperse the silica uniformly in the modified diene rubber, and this is advantageous for achieving both rolling resistance performance and wet grip performance.

The rubber component fed in the first step may be only the modified diene rubber. In other words, the rubber component added in the first step may be a rubber component consisting of only the modified diene rubber. Alternatively, a part of the unmodified diene rubber may be fed as a rubber component in the first step together with the modified diene rubber. In this case, the unmodified diene rubber is preferably fed in an amount of 50 mass % or less of the amount of the modified diene rubber. In other words, the unmodified diene rubber may be added in the first step in an amount of 50 mass % or less of the amount of the modified diene rubber. Thus, the effect of incorporating the polymer gel and the silica into the modified diene rubber can be enhanced by suppressing the amount of the unmodified diene rubber fed in the first step. The amount of the unmodified diene rubber fed in the first step is preferably 40 mass % or less of the amount of the modified diene rubber fed, and may be from 10 to 30 mass % as one embodiment. The total amount of the modified diene rubber and the unmodified diene rubber that are mixed in the first step is preferably 90 parts by mass or less, and more preferably 80 parts by mass or less, of 100 parts by mass of the rubber component.

Other than the modified diene rubber, silica and polymer gel described above, additives such as carbon black, a silane coupling agent, a process oil, zinc flower, stearic acid, an age resister, a wax and a resin may be added and mixed in the first step. However, because a vulcanizing agent and a vulcanization accelerator are added in a final mixing step after the second step, it is preferred that those are not added in the first step.

After mixing in the first step, the first mixture is once discharged from the mixing. machine, and cooled to, for example, 50° C. or lower. The mixing completion temperature in the first step (discharge temperature from the mixing machine) can be set to a range of, for example, from 140 to 170° C.

Thereafter, the first mixture and the unmodified diene rubber are fed to the mixing machine, followed by mixing, thereby obtaining a second mixture in the second step. Additives such as carbon black, a silane coupling agent, a process oil, zinc flower, stearic acid, an age resister, a wax and a resin (excluding a vulcanizing agent and a vulcanization accelerator) may be added, followed by mixing, in the second step. The silica and polymer gel fed in the first step maintain the state that those are incorporated into the modified diene rubber even after the completion of the second step. On the other hand, the carbon black does not have property to be easily incorporated into the modified diene rubber, as compared with the silica. Therefore, even in the case where the carbon black is fed in the first step. the carbon black is incorporated into the unmodified diene rubber fed in the second step, and can exert the reinforcing effect to the unmodified diene rubber.

After mixing in the second step, the second mixture is discharged from the mixing machine, and cooled to, for example, 50° C. or lower. The mixing completion temperature in the second step (discharge temperature from the mixing machine) can be set to a range of, for example, from 140 to 170° C.

Thereafter, a vulcanizing agent and a vulcanization accelerator are added to the second mixture, followed by mixing, in a final mixing step, thereby a rubber composition can be prepared. The mixing completion temperature in the final mixing step (discharge temperature from the mixing machine) can be set to, for example, 100° C. or lower such that vulcanization does not proceed.

The rubber composition thus obtained can be used in various rubber members. Preferably, the rubber composition is used in a tire, and can be applied to each site of a tire, such as a tread rubber or a sidewall rubber of a pneumatic tire having various sizes and to be used in a variety of applications, for example, for passenger cars or for heavy load of trucks and buses. Of those, the rubber composition is preferably used in a tread rubber of a tire. The rubber composition can be formed into a predetermined shape by, for example, extrusion processing according to the conventional method, and combined with other parts to prepare an unvulcanized tire (green tire). The unvulcanized tire can vulcanization-molded at, for example, from 140 to 180° C. to manufacture a pneumatic tire.

EXAMPLES

Examples of the invention are described below, but the invention is not construed as being limited to those examples.

Each mixing step of the first step (discharge temperature: 160° C.), the second step (discharge temperature: 160° C.) and the third step (final mixing step, discharge temperature: 90° C.) was conducted according to the formulations (parts by mass) shown in Table 1 below using Banbury mixer to prepare a rubber composition. Details of each component in Table 1 are as follows.

E-SBR: "SBR1502" manufactured by JSR Corporation, modified SBR having Tg of −52° C.

Modified S-SBR: "HPR350" manufactured by JSR Corporation, terminal alkoxyl group and amino group-modified solution-polymerized SBR having Tg of −33° C.

NR: RSS #3 (unmodified)

Carbon black: ISAF, "SEAST 6" manufactured by Tokai Carbon Co., Ltd.

Silica: "NIPSIL AQ" manufactured by Tosoh Silica Corporation (BET: 205 m$^2$/g)

Polymer gel: "NANOPRENE M20" manufactured by LANXESS, hydroxyl group-containing polymer gel having Tg of −20° C., containing SBR as a base Oil: "PROCESS NC 140" manufactured by TX Nippon Oil & Sun-Energy Corporation Silane coupling agent: "Si75" manufactured by Evonik Degussa Rosin resin: "HIRIMACK R100" manufactured by Harima Chemicals Group, Inc.

Stearic acid: "LUNAC S-20" manufactured by Kao Corporation

Zinc flower: "Zinc Flower #1" manufactured by Mitsui Mining & Smelting Co., Ltd.

Age resister: "ANTIGEN 6C" manufactured by Sumitomo Chemical Co., Ltd.

Wax: "SUNNOC N" manufactured by Ouchi Shiriko Chemical Industrial Co., Ltd.

Vulcanization accelerator 1: "SANCELER DM-G" manufactured by Sanshin Chemical Industry Co., Ltd.

Vulcanization accelerator 2: "SOXINOL CZ" manufactured by Sumitomo Chemical Co., Ltd.

Sulfur: "POWDERED SULFUR" manufactured by Tsurumi Chemical Industry Co., Ltd.

Abrasion performance, wet grip performance and rolling resistance performance of each rubber composition obtained were evaluated using each test piece having a predetermined shape obtained by vulcanizing each rubber composition at 160° C. for 30 minutes. Each evaluation method is as follows.

Abrasion performance: Abrasion loss was measured under the conditions of load: 40N, slip ratio: 30%, temperature: 23° C. and sand-falling amount: 20 g/min according to JIS K6264 using Lambourn abrasion tester manufactured by Iwamoto Seisakusho Co., Ltd., and indicated by an index as the value of Comparative Example 1 being 100. Abrasion loss is small and abrasion resistance is excellent, as the index is small.

Wet grip performance: Lupke type rebound resilience test was conducted according to HS K6255, and rebound resilience at 23° C. was measured. The result was indicated by an index as the value of Comparative Example 1 being 100. Rebound resilience is small and wet grip performance is excellent, as the index is small.

Rolling resistance performance: Tan δ was measured under the conditions of initial strain: 10%, dynamic strain: ±1%, frequency: 10 Hz and temperature: 60° C. using a viscoelasticity tester manufactured by Toyo Seiki Seisaku-Sho, Ltd. The result is indicated by an index as the value of Comparative Example 1 being 100. The value of tan δ is small and heat is difficult to be generated as the index is small, and therefore, this means that rolling resistance performance is excellent.

TABLE 1

| | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Ex. 1 | Ex. 2 | Ex. 3 | Ex. 4 | Ex. 5 |
|---|---|---|---|---|---|---|---|---|---|---|---|---|---|
| Component fed in first step (parts by mass) | | | | | | | | | | | | | |
| E-SBR | 30 | 30 | 30 | 30 | | | | | | | | | |
| Modified S-SBR | 60 | 60 | 60 | | 100 | 20 | 60 | 60 | 60 | 60 | 40 | 80 | 60 |
| NR | 10 | 10 | 10 | 10 | | | | | | | | | 10 |
| Carbon black | 15 | 15 | 15 | 15 | 15 | 15 | 15 | 15 | 15 | 15 | 15 | 15 | 15 |
| Silica | 60 | 60 | 60 | 60 | 60 | 60 | 60 | 60 | 60 | 60 | 60 | 60 | 60 |
| Polymer gel | | 5 | | 5 | 5 | 5 | 0.1 | 15 | 5 | 10 | 5 | 5 | 5 |
| Oil | 20 | 20 | 20 | 20 | 20 | 20 | 20 | 20 | 20 | 20 | 20 | 20 | 20 |
| Silane coupling agent | 5 | 5 | 5 | 5 | 5 | 5 | 5 | 5 | 5 | 5 | 5 | 5 | 5 |
| Rosin resin | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Zinc flower | 3 | 3 | 3 | 3 | 3 | 3 | 3 | 3 | 3 | 3 | 3 | 3 | 3 |
| Age resister | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 |

TABLE 1-continued

| | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Ex. 1 | Ex. 2 | Ex. 3 | Ex. 4 | Ex. 5 |
|---|---|---|---|---|---|---|---|---|---|---|---|---|---|
| Component fed in second step (parts by mass) | | | | | | | | | | | | | |
| E-SBR | | | | | | 70 | 30 | 30 | 30 | 30 | 50 | 10 | 30 |
| NR | | | | | | 10 | 10 | 10 | 10 | 10 | 10 | 10 | |
| Modified S-SBR | | | | 60 | | | | | | | | | |
| Component fed in final mixing step (parts by mass) | | | | | | | | | | | | | |
| Polymer gel | | | 5 | | | | | | | | | | |
| Vulcanization accelerator 1 | 1 | 1 | 1 | 1 | 1 | 1 | 1 | 1 | 1 | 1 | 1 | 1 | 1 |
| Vulcanization accelerator 2 | 1.5 | 1.5 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 | 2 | 2 |
| Evaluation (index) | | | | | | | | | | | | | |
| Abrasion performance | 100 | 100 | 103 | 107 | 110 | 114 | 100 | 110 | 98 | 100 | 100 | 96 | 99 |
| Wet grip performance | 100 | 96 | 93 | 98 | 88 | 100 | 99 | 84 | 86 | 83 | 87 | 82 | 88 |
| Rolling resistance performance | 100 | 103 | 105 | 110 | 95 | 106 | 102 | 100 | 96 | 97 | 99 | 94 | 98 |

The results obtained are shown in Table 1 above. The improvement of wet grip performance was observed in Comparative Example 2 in which the polymer gel was added, as compared with Comparative Example 1 using the modified diene rubber as the rubber component, but the effect was small, and rolling resistance performance was inferior to that of Comparative Example 1. In Comparative Example 3, the addition timing of the polymer gel was changed to the final mixing step from the first step, and the improvement effect of wet grip performance was improved as compared with Comparative Example 2, but abrasion resistance and rolling resistance performance were deteriorated. In Comparative Example 4, the feed timing of the modified diene rubber was changed to the second step from the first step, and abrasion resistance and rolling resistance performance were greatly deteriorated, as compared with Comparative Example 2. Comparative Example 5 is an example in which the rubber component is only the modified diene rubber, and abrasion resistance was deteriorated. In Comparative Example 6, the amount of the modified diene rubber fed in the first step was too small, process workability in the first step was poor, and abrasion resistance and rolling resistance performance were greatly deteriorated. In Comparative Example 7, the amount of the polymer gel added was too small, and the improvement effect of wet grip performance was not obtained. In Comparative Example 8, the amount of the polymer gel added was too large, and abrasion resistance was deteriorated. On the other hand, in Examples 1 to 5 in which the entire amounts of the modified diene rubber, polymer gel and silica were fed in the first step and the unmodified diene rubber was fed in the second step, wet grip performance was remarkably improved without deterioration of abrasion performance and rolling resistance performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for producing a rubber composition, the rubber composition including 100 parts by mass of a rubber component, from 20 to 150 parts by mass of silica, and from 1 to 10 parts by mass of a polymer gel which is crosslinked diene polymer particles, wherein
   from 30 to 90 parts by mass of at least one modified diene rubber selected from the group consisting of a styrene-butadiene rubber, a butadiene rubber, and a natural rubber, each having introduced therein at least one functional group selected from the group consisting of a hydroxyl group, an amino group, a carboxyl group, an alkoxyl group, and an epoxy group, and from 70 to 10 parts by mass of an unmodified diene rubber are used as 100 parts by mass of the rubber component,
   a polymer gel having a glass transition temperature of from −40 to −10° C. and having at least one functional group selected from the group consisting of a hydroxyl group, an amino group, a carboxyl group, an alkoxyl group, and an epoxy group is used as the polymer gel, and
   the method comprises a first step of mixing the entire amount of the modified diene rubber with the polymer gel together with the silica to obtain a first mixture, and a second step of mixing the unmodified diene rubber with the first mixture obtained.

2. The method for producing a rubber composition according to claim 1, wherein the unmodified diene rubber is added in an amount of 50 mass % or less of the amount of the modified diene rubber in the first step, and the total amount of the modified diene rubber and the unmodified diene rubber that are mixed in the first step is 90 parts by mass or less of 100 parts by mass of the rubber component.

3. The method for producing a rubber composition according to claim 1, wherein the rubber component added in the first step consists of the modified diene rubber.

4. The method for producing a rubber composition according to claim 1, wherein the entire amount of the polymer gel is mixed with the modified diene rubber and the silica in the first step.

5. The method for producing a rubber composition according to claim 1, wherein the entire amount of the silica is mixed with the modified diene rubber and the polymer gel in the first step.

6. A rubber composition obtained by the production method according to claim 1.

7. A pneumatic tire comprising the rubber composition according to claim 6.

8. The method for producing a rubber composition according to claim 1, wherein the rubber composition further includes from 10 to 40 parts by mass of carbon black, per 100 parts by mass of the rubber component, the amount of the silica added is larger than the amount of the carbon black added, and the carbon black is mixed with the modified diene rubber, the polymer gel and the silica in the first step.

9. The method for producing a rubber composition according to claim 3, wherein the entire amount of the polymer gel is mixed with the modified diene rubber and the silica in the first step.

10. The method for producing a rubber composition according to claim 4, wherein the entire amount of the silica is mixed with the modified diene rubber and the polymer gel in the first step.

11. The method for producing a rubber composition according to claim 9, wherein the entire amount of the silica is mixed with the modified diene rubber and the polymer gel in the first step.

12. The method for producing a rubber composition according to claim 10, wherein the rubber composition further includes from 10 to 40 parts by mass of carbon black, per 100 parts by mass of the rubber component, the amount of the silica added is larger than the amount of the carbon black added, and the carbon black is mixed with the modified diene rubber, the polymer gel and the silica in the first step.

13. The method for producing a rubber composition according to claim 12, wherein the rubber component added in the first step consists of the modified diene rubber.

* * * * *